United States Patent [19]

Cantoni

[11] Patent Number: 4,841,919
[45] Date of Patent: Jun. 27, 1989

[54] FUEL FEED DEVICE, PARTICULARLY FOR INTERNAL COMBUSTION ENGINES, COMPRISING FUEL FILTERING AND EMULSIFYING MEMBERS

[75] Inventor: Angelo Cantoni, Rome, Italy

[73] Assignee: Ital Idee s.r.l. an Italian Limited Liability Company, Rome, Italy

[21] Appl. No.: 195,501

[22] Filed: May 18, 1988

[30] Foreign Application Priority Data

May 20, 1987 [IT] Italy .............................. 47953 A/87

[51] Int. Cl.⁴ ............................................. F02D 19/00
[52] U.S. Cl. .................................... 123/25 A; 210/86
[58] Field of Search ................... 123/25 A, 557, 25 R; 210/86

[56] References Cited

U.S. PATENT DOCUMENTS

| | | | |
|---|---|---|---|
| 4,420,392 | 12/1983 | Harris | 210/86 |
| 4,637,351 | 1/1987 | Pakula | 123/25 A |
| 4,664,088 | 5/1987 | Cantoni | 123/557 |
| 4,732,671 | 3/1988 | Thornton et al. | 210/86 |

Primary Examiner—E. Rollins Cross
Attorney, Agent, or Firm—Fleit, Jacobson, Cohn & Price

[57] ABSTRACT

The present invention relates to a device connected into an internal combustion engine fuel feed circuit and comprising a filter unit and emulsifier for the engine fuel feed, there being provided two or more fuel intakes located in different positions within said filter unit and a flow disintegrating emulsifier member.

7 Claims, 2 Drawing Sheets

FUEL FEED DEVICE, PARTICULARLY FOR INTERNAL COMBUSTION ENGINES, COMPRISING FUEL FILTERING AND EMULSIFYING MEMBERS

TITLE OF THE INVENTION

Fuel feed device, particularly for internal combustion engines, comprising fuel filtering and emulsifying members.

BACKGROUND OF THE INVENTION

In the operation of heat engines, in particular internal combustion engines, the presence of impurities and water in the fuel can seriously compromise the proper operation and life not only of the constituent members of the fuel feed system, i.e. the carburation members if a conventional carburetor is present, or the injectors if direct or indirect injection systems are used, but also of the engine itself.

Filters are currently located in the fuel feed pipe to filter out the solid impurities present in the fuel, but these filters of conventional structure are unable to remove the water from the fuel.

This water can either be present in the fuel when supplied, or can collect subsequently due to condensation of the moisture in the air present in the tank.

The presence of large water droplets in the fuel feed circuit has various consequences, such as low efficiency, non-uniform operation (misfiring), irregular idling, starting difficulties and oxidation of surfaces. Moreover, this water tends to accumulate in said filters making it necessary to periodically drain them and also leading to rapid deterioration of the filtering surfaces.

There is therefore a need for providing the fuel feed circuit of an internal combustion engine with a device which not only provides filtration but also prevents water accumulating by dispersing it in the fuel in a controlled manner so as not to reduce the engine efficiency, but instead to obtain the positive contribution which it provides if emulsified as a fine dispersion within the fuel.

SUMMARY OF THE INVENTION

This result is attained according to the present invention by a device connected into the feed circuit, comprising a fuel filtering member and emulsifier for internal combustion engines.

Specifically, the filter-emulsifier unit consists of a closed casing to which a fuel inlet pipe and outlet pipe are connected and which is divided by the filter element into two separate chambers which communicate with the inlet pipe and outlet pipe respectively, the fuel outlet pipe from the casing being provided with a Venturi tube. The Venturi tube is sized such that during normal-speed running of the internal combustion engine, its throat is under a sufficient vacuum generated by the effect of the fuel flow from the filter unit to draw through one or more lateral ports any water which has accumulated in that region of the filter unit which after assembly is located at the lowest level, the water tending to accumulate here as its density is higher than that of the fuel.

The connection between the intake ports of the Venturi tube and the accumulation regions within the filter unit is made by tubes of a shape and length suitable for the type of filter unit used and for the position which it occupies after assembly.

The fluid drawn through the intakes into the vacuum region of the Venturi tube is finely dispersed into the main fuel stream leaving the filter unit so that if water is present this reaches the injectors or carburetors emulsified with the fuel.

The small dimensions of the lateral intake ports ensure that even if a large amount of water is present it is drawn in by the main fuel stream in a percentage which does not create difficulties for the engine.

Moreover, as the water has a much higher surface tension than the fuel, by correctly sizing said lateral ports it can be made impossible to draw said water in if the fuel is flowing at a low rate, this low rate corresponding to the idling state of the internal combustion engine when it is particularly sensitive to any carburation irregularities. This does not happen when the engine is running at normal speed as greater volumetric throughputs are concerned.

If properly emulsified, the water can have a beneficial effect in reducing the temperature peaks during the combustion cycle.

The filter element of the device according to the invention is a cartridge of paper, felt or other porous material.

The filter-emulsifier unit is provided with sensor means for measuring the pressure drop undergone by the fuel in passing through it, these means providing a warning signal if a predetermined pressure drop between the inlet and outlet of the unit is exceeded, this indicating the need to replace the filter element.

DESCRIPTION OF THE DRAWINGS

The invention will be more apparent from the description of three embodiments thereof given hereinafter with reference to the accompanying drawings, in which.

DETAILED DESCRIPTION

Figure 1:
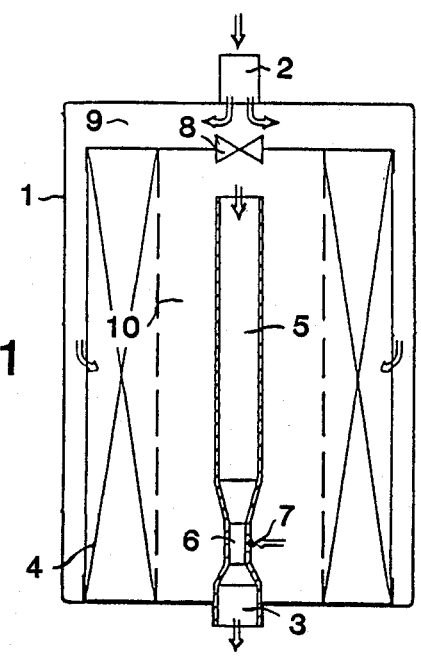
FIGS. 1, 2 and 3 are sectional views of three embodiments of the feed device for internal combustion engines according to the invention, and relating to three different fuel flow orientations.
Figure 2:
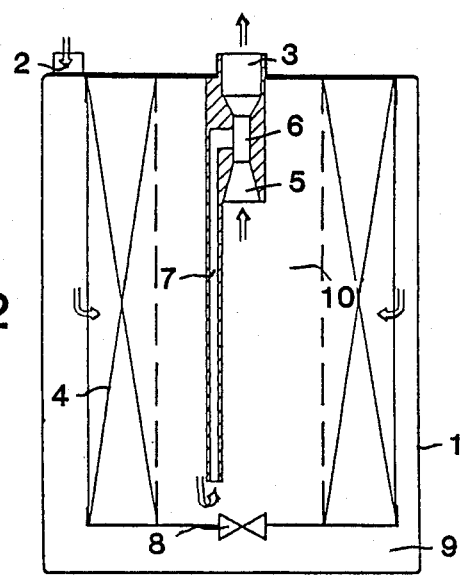
Figure 3:
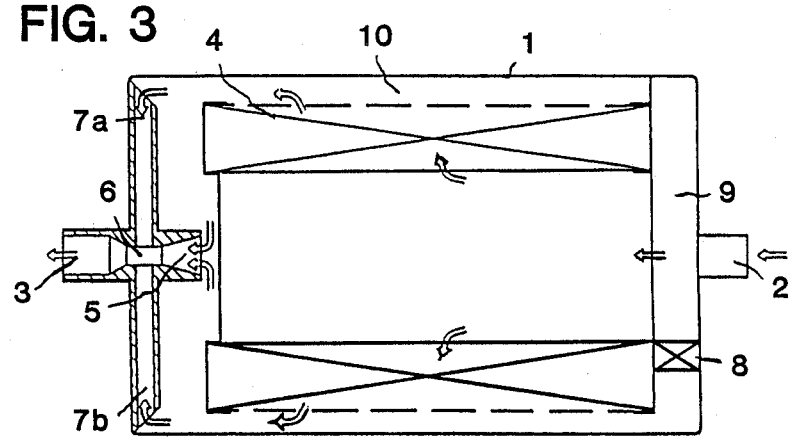

With reference to FIGS. 1, 2 and 3, these show sections through three embodiments of the filter-emulsifier unit according to the invention, which comprises an outer casing 1 in which the fuel enters through the inlet pipe 2 into the chamber 9 and then passes through the filter pack 4 into the chamber 10.

The main fuel stream leaves the filter unit through the outlet pipe 3 in which there is located a Venturi tube 6 having one or more ports connected by the intake tube 7 of FIGS. 1 and 2 and by the tubes 7a and 7b of FIG. 3 to those regions of the filter unit in which the aqueous component tends to accumulate by having a higher density than the fluid flowing through the filter unit.

If a too high pressure difference exists between the chamber 9 and the chamber 10, the valve 8 closes an electrical circuit to warn that the filter pack is clogged and requires replacement.

Specifically, FIG. 1 shows a sectional view of a filter-emulsifier unit according to the invention in which the fuel outlet pipe 3 with its Venturi tube 6 is positioned at the lowest level of the filter unit so that one or more secondary intake ports 7 provided in the low-pressure section of the main duct of the Venturi tube 6 directly draw in the greater density fluid, so preventing it accumulating.

FIG. 2 shows a sectional view of a filter-emulsifier unit according to the invention in which the fuel outlet pipe 3 with its Venturi tube 6 is positioned at the highest level of the filter unit, the secondary intake tube 7 for the Venturi tube 6 extending to the opposite end of the filter unit, where the denser fluid normally accumulates, as said end is at the minimum level when the filter unit has been mounted.

FIG. 3 shows a sectional view of a filter-emulsifier unit according to the invention for horizontal positioning, the fuel inlet pipe 2 and outlet pipe 3 being in a lateral position and one or more secondary intake tubes 7a and 7b for the Venturi tube 6 being disposed symmetrically to draw in any denser fluid which accumulates on those lateral surfaces located at the lowest level after assembly.

Figure 4:
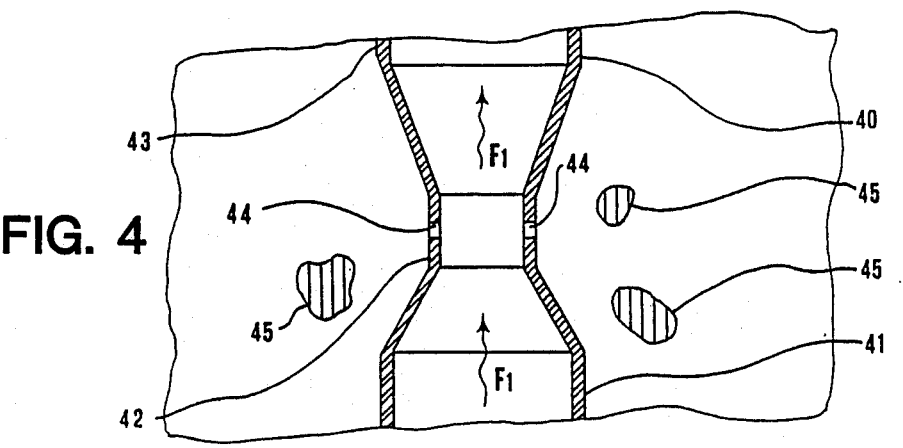
FIGS. 4, 5 and 6 show three different operating states of the emulsifier member provided in the devices of FIGS. 1, 2 and 3.
Figure 5:
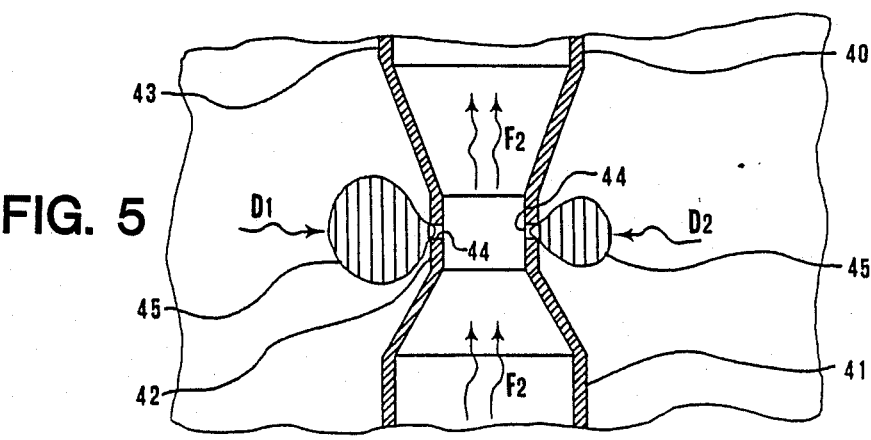
Figure 6:
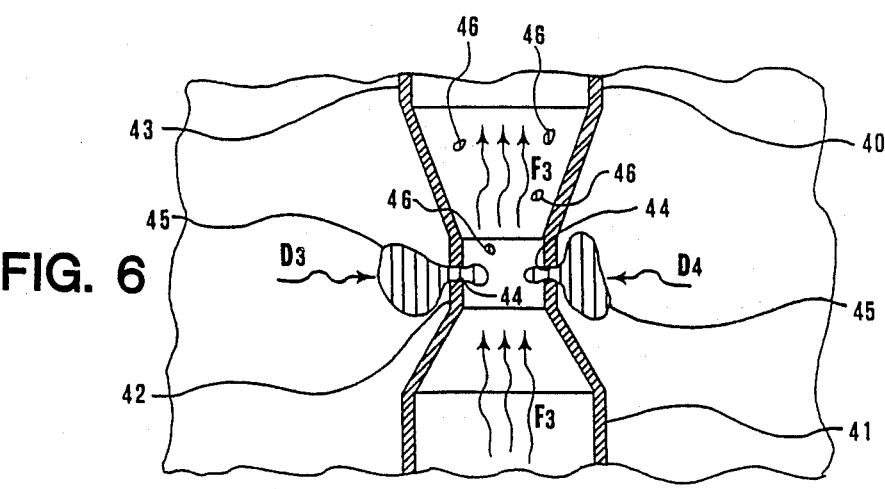

FIGS. 4, 5 and 6 illustrate in detail the operation of the Venturi tube of the device according to the invention.

In these figures the general structure of the Venturi tube is indicated by 40 and in known manner comprises a portion of relatively large cross-section 41, connected to a portion of reduced cross-section 42, followed by a further portion of relatively large cross-section 43.

In known manner, depending on the flow rate or volumetric throughput, the flow being indicated by the arrows F1, F2 and F3 (shown single, double and triple to indicate increasing flow rates or throughputs), a corresponding vacuum is created in the reduced cross-section region 42 of the Venturi tube 40 immersed in the fuel, and this induces an inlet flow through the sized ports 44, 44' provided in the reduced cross-section region.

At the construction stage, the size of the reduced cross-section region 42 of the Venturi tube 40 and the size of the ports 44, 44' are chosen such that when water droplets, shown by hatched areas indicated by 45, are present the combined effect of the vacuum induced by the flow or throughput F1, F2 and F3 gives rise to situations which differ for different cases.

In particular, in the case of FIG. 4, the flow F1 creates a vacuum insufficient to displace the water droplets 45. This situation corresponds to idling of the internal combustion engine. No emulsification takes place and only fuel reaches the carburetors or injectors.

In the case of FIG. 5, the flow F2 is greater than that of FIG. 4 and the sucking action indicated by the arrows D1, D2 causes the water droplets 45 to approach and adhere to the ports 44, 44'. However, the high surface tension of water means that the water droplets 45 stop at the ports 44, 44'.

In the case of FIG. 6, the flow F3 is considerable. The suction action represented by the arrows D3, D4 is such as to overcome the surface tension of the droplets 45, which then penetrate through the ports 44, 44' to disintegrate into minute droplets 46 which form a fine emulsion with the fuel flowing through the Venturi tube 40.

The net result is as follows.

When the internal combustion engine is idling, no water mixes with the fuel. In this way the delicate idling equilibrium of an internal combustion engine is not compromised.

When the engine is running at speed (FIG. 6), water is emulsified to produce an advantageous effect in the internal combustion engine operating cycle.

FIG. 5 shows an intermediate situation between that of FIG. 4 (engine idling) and that of FIG. 6 (engine running at speed).

What is claimed is:

1. A fuel feed device, particularly for internal combustion engines, with fuel filtering and emulsifying members, characterised by comprising a closed casing to which a fuel inlet pipe and outlet pipe are connected and which is divided by a filter element into two separate chambers which communicate with the inlet pipe and outlet pipe respectively, the outlet pipe being provided with a Venturi tube structure, the throat of the Venturi tube structure being provided with one or more sized ports, said ports being positioned in, or connected by one or more tubes to, that region of the closed casing in which any water present in the feed fuel can accumulate, the Venturi tube structure being dimensioned such that when water passes into the throat, said water is emulsified with the fuel leaving the closed casing.

2. A fuel feed device according to claim 1, characterised in that between said two separate chambers there is interposed a pressure relief valve which is set such that fuel can pass from the first to the second of said two chambers when overpressure is present due to clogging or obstruction of the filter element.

3. A fuel feed device according to claim 2, characterised in that the pressure relief valve is connected to the control means of a circuit for indicating when the filter element is clogged or obstructed.

4. A fuel feed device according to claim 1, characterised in that the closed casing is substantially cylindrical and of vertical axis, the fuel inlet pipe being positioned in the top and the outlet pipe fitted with the Venturi tube structure being positioned in the bottom of the casing (FIG. 1).

5. A fuel feed device according to claim 1, characterised in that the closed casing is substantially cylindrical and of vertical axis, the fuel inlet pipe being positioned in the top substantially at the casing periphery, the outlet pipe provided with the Venturi tube structure being positioned in the top substantially aligned with the casing axis, the throat of the Venturi tube structure being connected to a tube which extends substantially to the bottom of the casing (FIG. 2).

6. A fuel feed device according to claim 3, characterised in that the closed casing is substantially cylindrical and of horizontal axis, the fuel inlet pipe being positioned in one of the casing ends, the outlet pipe provided with the Venturi tube structure being positioned in the other of the ends, the throat of the Venturi tube structure being connected to a plurality of symmetrical tubes extending radially substantially to the side wall of the casing (FIG. 3).

7. A fuel feed device according to claim 1, characterised in that the Venturi tube structure and the ports provided in its throat are dimensioned such that emulsification takes place only when a predetermined volumetric flow rate through the Venturi tube structure is exceeded.

* * * * *